(12) United States Patent
Eppard (10) Patent No.: US 8,844,696 B2
(45) Date of Patent: Sep. 30, 2014

(54) CLUTCH FOR INJURY MITIGATION SYSTEM FOR POWER TOOLS

(75) Inventor: Erin F. Eppard, Phoenix, AZ (US)

(73) Assignee: Robert Bosch GmbH, Stuttgart (DE)

( * ) Notice: Subject to any disclaimer, the term of this patent is extended or adjusted under 35 U.S.C. 154(b) by 1482 days.

(21) Appl. No.: 12/030,511

(22) Filed: Feb. 13, 2008

(65) Prior Publication Data

US 2008/0196991 A1 Aug. 21, 2008

Related U.S. Application Data (60) Provisional application No. 60/902,196, filed on Feb. 20, 2007, provisional application No. 60/902,195, filed on Feb. 20, 2007, provisional application No. 60/922,486, filed on Apr. 9, 2007.

(51) Int. Cl.

| F16D 43/21 | (2006.01) |
|---|---|
| F16D 7/02 | (2006.01) |
| B26D 1/14 | (2006.01) |
| F16D 65/18 | (2006.01) |
| F16P 3/12 | (2006.01) |
| F16D 127/00 | (2012.01) |
| F16D 121/16 | (2012.01) |

(52) U.S. Cl.
CPC .............. *F16P 3/12* (2013.01); *F16D 2127/008* (2013.01); *F16D 65/18* (2013.01); *F16D 2121/16* (2013.01)
USPC .............................. 192/56.55; 83/543; 83/666

(58) Field of Classification Search
USPC .............. 192/56.1, 56.5, 56.51, 56.52, 56.55, 192/56.61; 464/39, 36, 38; 83/543, 665, 83/666; 30/388–391; 173/178
See application file for complete search history.

(56) References Cited

U.S. PATENT DOCUMENTS

| 1,672,582 A | 6/1928 | Tenney |
|---|---|---|
| 1,736,970 A | 11/1929 | Haas |
| 2,344,673 A | 3/1944 | Brown |
| 2,683,362 A | 7/1954 | Bowman |
| 2,802,354 A | 8/1957 | Bohnhoff et al. |
| 3,119,247 A | 1/1964 | Grabovac |
| 3,185,275 A | 5/1965 | Orwin |
| 3,472,347 A | 10/1969 | Johnson |
| 3,722,644 A | 3/1973 | Steinhagen |
| 3,774,738 A | 11/1973 | Steinhagen |
| 3,930,422 A | 1/1976 | Morimatsu |

(Continued)

FOREIGN PATENT DOCUMENTS

| GB | 2165899 A | * | 4/1986 |
|---|---|---|---|
| GB | 2 275 745 | | 9/1994 |
| GB | 2275745 A | * | 9/1994 |

*Primary Examiner* — Gene Crawford
*Assistant Examiner* — Terry Chau
(74) *Attorney, Agent, or Firm* — Maginot, Moore & Beck (57) ABSTRACT

A clutch mechanism includes a bolt threadably received by a drive shaft and configured to secure the blade on an inner washer disposed about the drive shaft. The clutch mechanism also includes a spring assembly that is generally annularly disposed around the bolt. When the spring assembly is compressed, the spring assembly is configured to grip the blade inner washer and the spring assembly. At least one shallow pocket and at least one deep pocket are disposed in a lower surface of an upper retainer, and at least one geometric spacer extends from the spring assembly. In the coupled condition, the geometric spacer is engaged with the shallow pocket, and in the uncoupled condition, the plug structure is engaged with the deep pocket.

4 Claims, 7 Drawing Sheets

(56) References Cited

U.S. PATENT DOCUMENTS

| | | |
|---|---|---|
| 3,979,925 A | 9/1976 | Kato |
| 4,205,572 A * | 6/1980 | Weiner .......................... 83/666 |
| 4,220,230 A | 9/1980 | Hansen |
| 4,239,096 A | 12/1980 | Smilgys et al. |
| 4,263,996 A | 4/1981 | Putney |
| 4,838,400 A | 6/1989 | Fortune |
| 5,253,573 A | 10/1993 | Modoux |
| 5,346,022 A | 9/1994 | Krivec |
| 5,855,517 A | 1/1999 | Lepold |
| 6,295,910 B1 | 10/2001 | Childs et al. |
| 7,137,329 B1 * | 11/2006 | Moser ............................ 83/543 |
| 7,905,786 B2 * | 3/2011 | Eppard .......................... 464/36 |

* cited by examiner

CLUTCH FOR INJURY MITIGATION SYSTEM FOR POWER TOOLS

CROSS REFERENCE TO RELATED APPLICATION

The present application claims priority to Provisional Application No. 60/902,196 titled "Injury Mitigation System for Power Tools" filed on Feb. 20, 2007, Provisional Application No. 60/902,195 titled "Decoupling Mechanism for Power Tools" filed on Feb. 20, 2007, and Provisional Application No. 60/922,486 titled "Clutch for Injury Mitigation System for Power Tools" filed on Apr. 9, 2007, which are specifically incorporated by reference.

BACKGROUND OF THE INVENTION

The present invention generally relates to power tools, and more particularly, to a clutch that can be used as part of safety detection and protection systems for power tools such as circular saws of the type that are used for cutting wood and other materials.

For as long as power tools have existed, there has been concern for the safety of those who operate them. This is particularly true with regard to power tools of the type which have relatively large exposed moving blades that can easily cause serious injury to individuals who carelessly use the tool or who are the victim of a true accident that results from unforeseen conditions. While safety systems have been developed for machine tools and other commercial tools, such as stamping tools, punch presses and other machines which exert great force in manufacturing metal and other parts, such systems often have a level of sophistication and complexity that is achieved only at a cost that is prohibitive if considered for use in tools that are marketed to individual consumers or small contractors and tradesmen.

More particularly, the well known circular saw that is used by woodworkers and tradesmen has a rotating blade that can be exposed during use even though blade guards have been provided with such saws when sold for the last several decades. Such blade guards, while effective to prevent some injuries, are considered unwieldy by many operators. In fact, many operators find that such blade guards actually interfere with the use of the circular saws and therefore remove such blade guards most of the time. Obviously, a rotating circular saw blade can cause great injury to an operator and countless hand injuries occur annually because of careless use or the occurrence of fortuitous accidents.

Safety systems have been developed for use on saws to stop the blade when the operator's hand approaches the blade and which trigger a brake mechanism that typically includes a pawl structure that is urged into the blade by a biasing mechanism that is retained by a fusible member that is melted by a high energy electrical current. Severing the fusible member releases the pawl to stop the blade, or in some embodiments causes the blade to be retracted down below the work surface in the case of the system being utilized with a table saw. All of these systems have one or more disadvantages in terms of cost, convenience of use, early and effective detection of a dangerous condition and the ability to provide graduated protective actions as a function of the characteristics that develop during a potentially dangerous condition. Further, many protection systems are destructive to the blade to the extent that the blade must be replaced after a braking event.

SUMMARY OF THE INVENTION

A clutch mechanism for a saw having a rotating blade that is driven by a motor that is coupled by a drive shaft includes a bolt. The bolt is threadably received by the drive shaft and configured to secure the blade on an inner washer disposed about the drive shaft. The clutch mechanism also includes a spring assembly that is generally annularly disposed around the bolt. When the spring assembly is compressed, the spring assembly is configured to grip the blade inner washer and the spring assembly. An upper retainer is generally annularly disposed around the bolt and is configured to compress the spring assembly. At least one shallow pocket and at least one deep pocket are disposed in a lower surface of the upper retainer, and at least one geometric spacer extends from the spring assembly. In the coupled condition, the geometric spacer is engaged with the shallow pocket in the lower surface to compress the spring assembly. In the uncoupled condition, the plug structure is engaged with the deep pocket to release the compression on the spring assembly and to decrease the grip on the blade.

DETAILED DESCRIPTION OF THE EMBODIMENTS OF THE PRESENT INVENTION

Briefly stated, the present clutch for an injury mitigation system will be shown and described with various embodiments of a detection system as well as various embodiments of a protection system that can operate to mitigate injury to the tissue of an operator during operation of a power tool. While the embodiments that are illustrated and described herein comprise systems for a circular saw, it should be understood to those of ordinary skill in the art that the detection system as well as aspects of the protection systems are applicable to other power tools. The invention is also applicable to other broader applications that may be implemented in various industries and endeavors. Shop tools other than circular saws are particularly capable of having detection and protection systems adapted for their use, using the concepts and principles of the embodiments shown and described herein.

Generally, the detection system senses when an operator makes contact with the blade and initiates the protection system. The protection system preferably initiates a braking mechanism, a stopping mechanism and a clutch mechanism so that the blade will stop rapidly.

Figure 1:
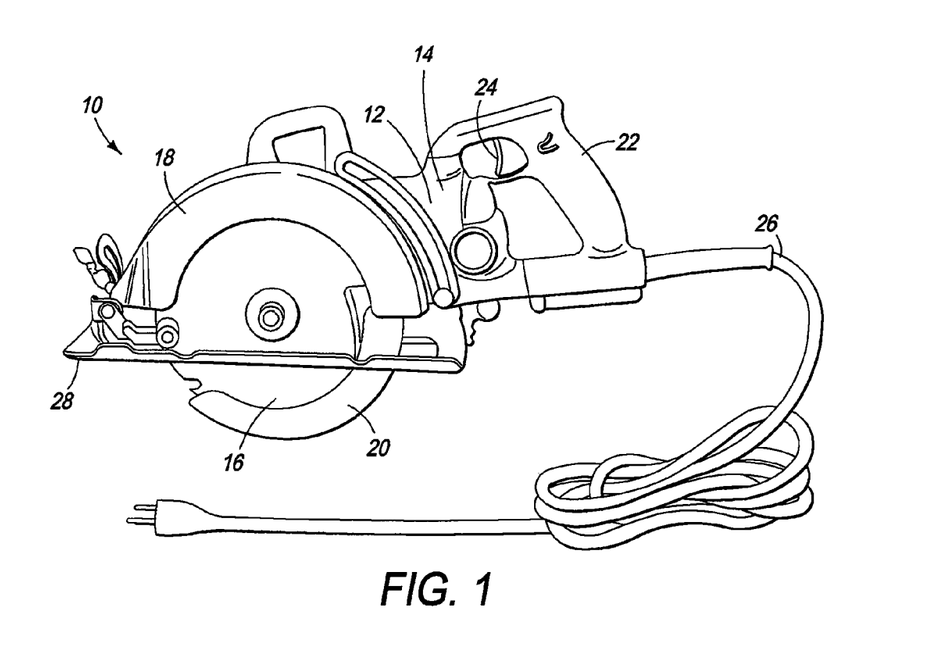
FIG. 1 is a side view of a circular saw having an injury mitigation system of the present invention including a detection system and a protection system.

Referring now to FIG. 1, a representative circular saw is indicated generally at 10 and includes a motor 12 disposed in a motor housing 14, which is used to rotate a blade 16 housed in an upper protective guard 18 and a lower guard 20. A handle 22 extends from the motor housing 14 and includes a trigger 24 and a power cord 26. A base plate 28 is generally transverse to the blade 16 and extends around the blade.

Figure 2:
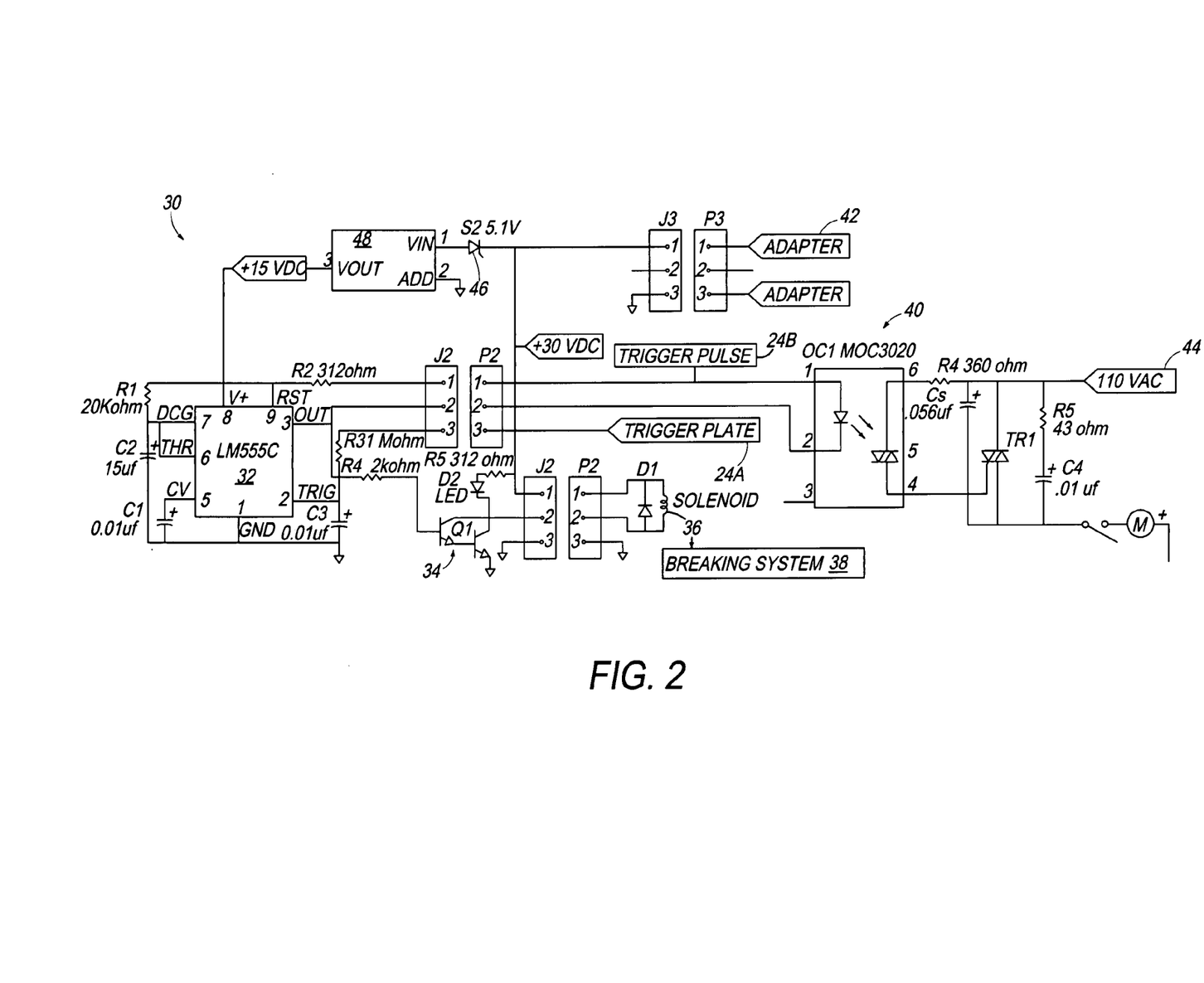
FIG. 2. is an electrical schematic diagram of representative circuitry for the detection system.

Referring now to FIG. 2, the detection system 30 will be described. The detection system 30 is configured to detect when an operator makes contact with the blade 16, and to initiate the protection system. For an effective detection system 30, it is necessary that the detection of the operator's contact with the blade 16, as well as the generation of an actuating signal to the protection system, be done in a very short time. While the amount of time can vary upwardly or downwardly depending upon the nature of operation of the detecting system 30 and specific operation conditions, generally the faster the operation of the detection system the better.

In order to operate a circular saw 10, the operator must constantly hold the trigger 24 down. The present detection system 30 operates by applying a voltage to the trigger plate 24A of the saw. The trigger 24 includes circuitry which is capable of detecting the absence of a voltage on the trigger. When the operator's body comes into contact with the blade 16 (such as with the operator's fingers), the operator's body shorts the voltage on the trigger 24A to ground. In other words, the operator's body completes the circuit to ground by touching the blade 16.

The missing voltage on the trigger plate 24A is detected by a timing circuit or sensor 32 (preferably a 555 timer), which emits an actuating signal to activate a transistor switch 34 (preferably a Darlington type transistor or relay), which energizes a solenoid or relay 36 to actuate a braking mechanism. It is contemplated that the solenoid 36 can be energized in response to a measured predetermined duration of the absence of applied voltage to the trigger plate 24A.

In the preferred embodiment, +15 volts is constantly applied through the operator's body by the operator's finger making contact with the trigger plate 24A. It is contemplated that other voltages can be used that are relatively comfortable for the user. When the operator shorts the electricity to ground, the 555 timer 32 senses a drop in voltage on the trigger. When the 555 timer 32 senses the drop in voltage, it sends a +15 volt output charge to activate the Darlington transistor 34. The Darlington transistor 34 acts as a switch for the solenoid 36 to release the braking mechanism on the blade 16.

With regard to the specific circuitry that is used in the preferred embodiment of detection system 30, the electrical schematic diagram of representative circuitry is shown in FIG. 2. The following description refers to the preferred circuitry of FIG. 2.

To run a safe voltage to the operator through the trigger plate 24A, the dangerous voltages running to the saw 10 are isolated from the operator. When the dangerous high voltage is isolated, the operator is able to contact the trigger to complete part of the circuit at a relatively low voltage. In the preferred embodiment, this isolation is accomplished by making an optiosolator circuit, indicated generally at 40, which isolates the high voltage (input from the 110V socket 44) from the low voltage (input from a 30V adapter 42).

The optoisolator circuit 40 uses an extension of the main power wire using 14 AWG wire with #10 solderless terminals for connections. A 43Ω resistor (R5), 01 μF capacitor (C4), and a snubberless 600 V, 25 A TRIAC (TR1) are wired to the optoisolator extension in the circuit. A TRIAC (Triode or relay for alternating current) is a bidirectional electronic switch that can conduct current in either direction when it is triggered. From the snubberless TRIAC (TR1), a 0.056 μF (C5), a 360Ω resistor (R4) are wired to pin 6 of the optoisolator TRIAC-output 6 DIP. The snubberless TRIAC is wired to pin 4 of the optoisolator TRIAC-output. Pin 1 of the optoisolator TRIAC-output (40) is preferably connected to a 2×0.5×0.02" copper sheet molded around the trigger 24 forming the trigger plate 24A, preferably with a #10 solderless terminal and #4–40×¼" round head slotted zinc bolt and nut. The trigger is preferably wired to pin 2 on the precision 555 timer 8-DIP. Pin 2 on the optoisolator TRIAC-output (40) is preferably connected to pin 3 on the 555 timer 32.

In the preferred embodiment, the power of a 30 V 400 mA, AC to DC adaptor (32) is emitted through 22 AWG four wire shielded communications wire to a 5 V, 1 A zenor diode (46) before reaching a +15V, 1 A voltage regulator (48) for the low-voltage electrical components. While a 400 mA power supply 42 is incorporated, it is contemplated that other power supplies can be used. Preferably, 18-AWG four wire shielded communications wire is used to connect the touch switch to 18-DIP and 8-DIP sockets containing: the 555 timer (32), 0.01 μF capacitor one (C1), 15 μF (C2), 0.01 μF (C3), 20 KΩ resistor one (R1), 312Ω (R2), 1 MΩ (R3), and the NPN 100 V Darlington transistor (34). A 22-AWG four wire shielded communications wire runs from the adaptor (32) and the 555 timer (32) and base of the Darlington transistor (34) to the 0.75" diameter 28 VDC tubular solenoid (36). The solenoid (36) is attached to a grounded bolt with a #12 solderless terminal.

When the voltage on the trigger decreases, the optoisolator 40 will preferably shut down the TRIAC (TR1). In turn, the TRIAC (TR1) will preferably shut down the power to the motor 12.

Referring now to FIGS. 3-6, the detection system 30 is used to actuate a braking mechanism, indicated generally at 50, to initiate braking of the blade 16. Preferably, the braking mechanism 50 is configured to completely stop the blade 16 within 0.05 seconds of the operator contacting the blade.

The braking mechanism 50 includes a caliper brake mechanism indicated generally at 52, and a brake actuation mechanism indicated generally at 54. The brake actuation mechanism 54 includes the solenoid 36 of the detection system, which actuates the caliper brake mechanism 52 to clamp down onto the blade 16. Preferably, the caliper brake mechanism 52 clamps down onto the blade 16 generally near the periphery of the blade, but generally radially inward from the teeth of the blade.

The caliper brake mechanism 52 is generally "C"-shaped with a first portion 56 including a tube 58 for slidingly receiving a first caliper member 60, a second portion 62 including a second caliper member 64, and a tube 66 located therebetween. When the first caliper member 60 is disposed in the tube 58, the first caliper member 60 and the second caliper member 62 are generally coaxial and oppose each other.

The first caliper member 60 includes a rod 68 having a proximal end 70 and a distal end 72. The proximal end 70 has an extension member 74 that extends from the rod 68 and an engaging structure 76 generally transverse to the rod. A retainer member 75 is preferably slidingly and concentrically disposed on the rod 68 beneath the extension member 74. The retainer member 75 prevents the displacement of a concentrically disposed compression spring 78 to the extension member 74.

The compression spring 78 extends down into a cylindrical casing 80 that is concentrically disposed around the rod 68. Inside the casing 80, the rod 68 is attached to a generally cylindrical rubber stopper 82 that protrudes from the casing. The rod 68, the casing 80 and the rubber stopper 82 preferably have a static relationship to each other.

Figure 3:
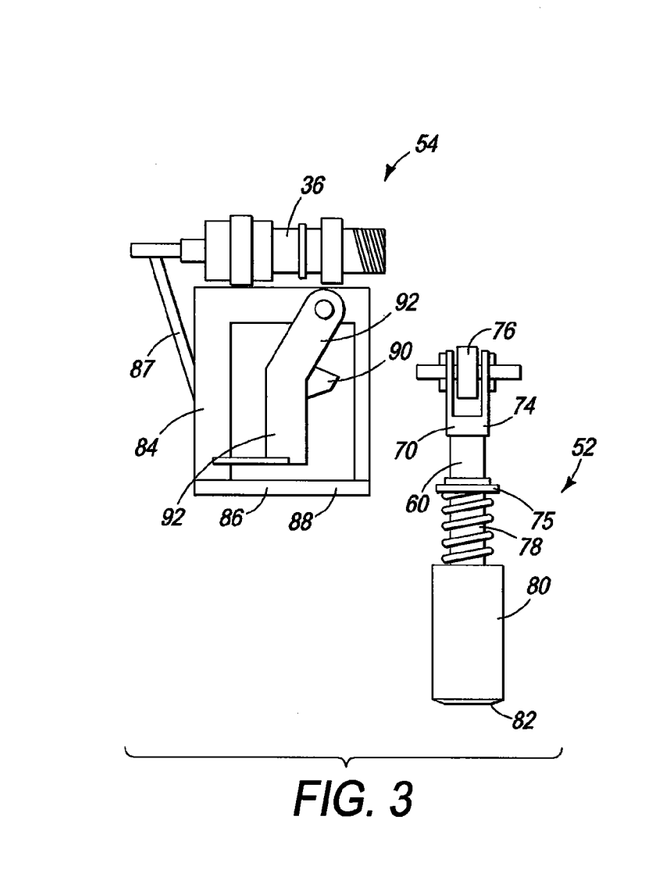
FIG. 3 is an exploded view of a braking mechanism including a side view of a brake actuation mechanism and a top view of a first caliper member.
Figure 4:
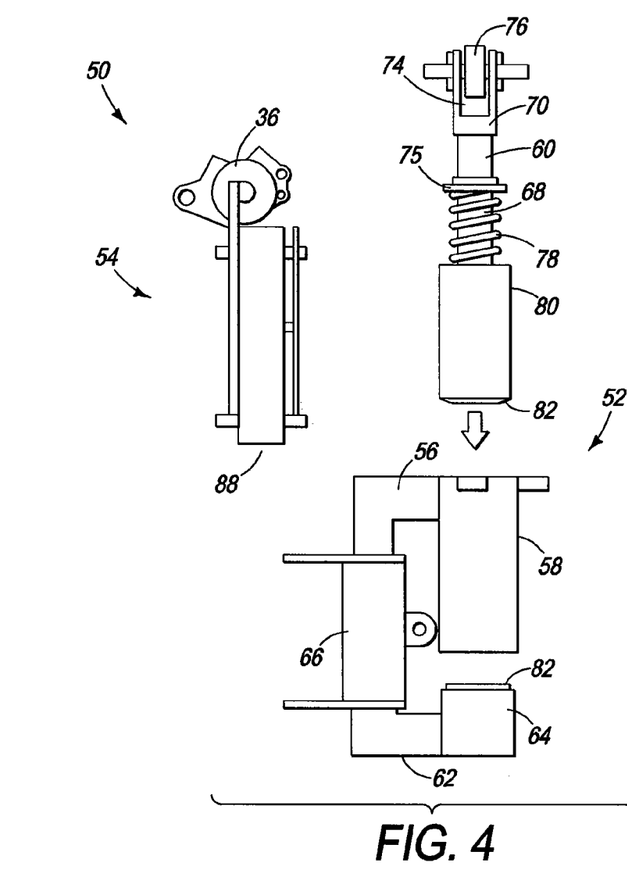
FIG. 4 is an exploded view of the full mechanical braking mechanism including a top view of the brake actuation mechanism, a top view of the first caliper member, and a top view of the caliper brake mechanism.
Figure 6:
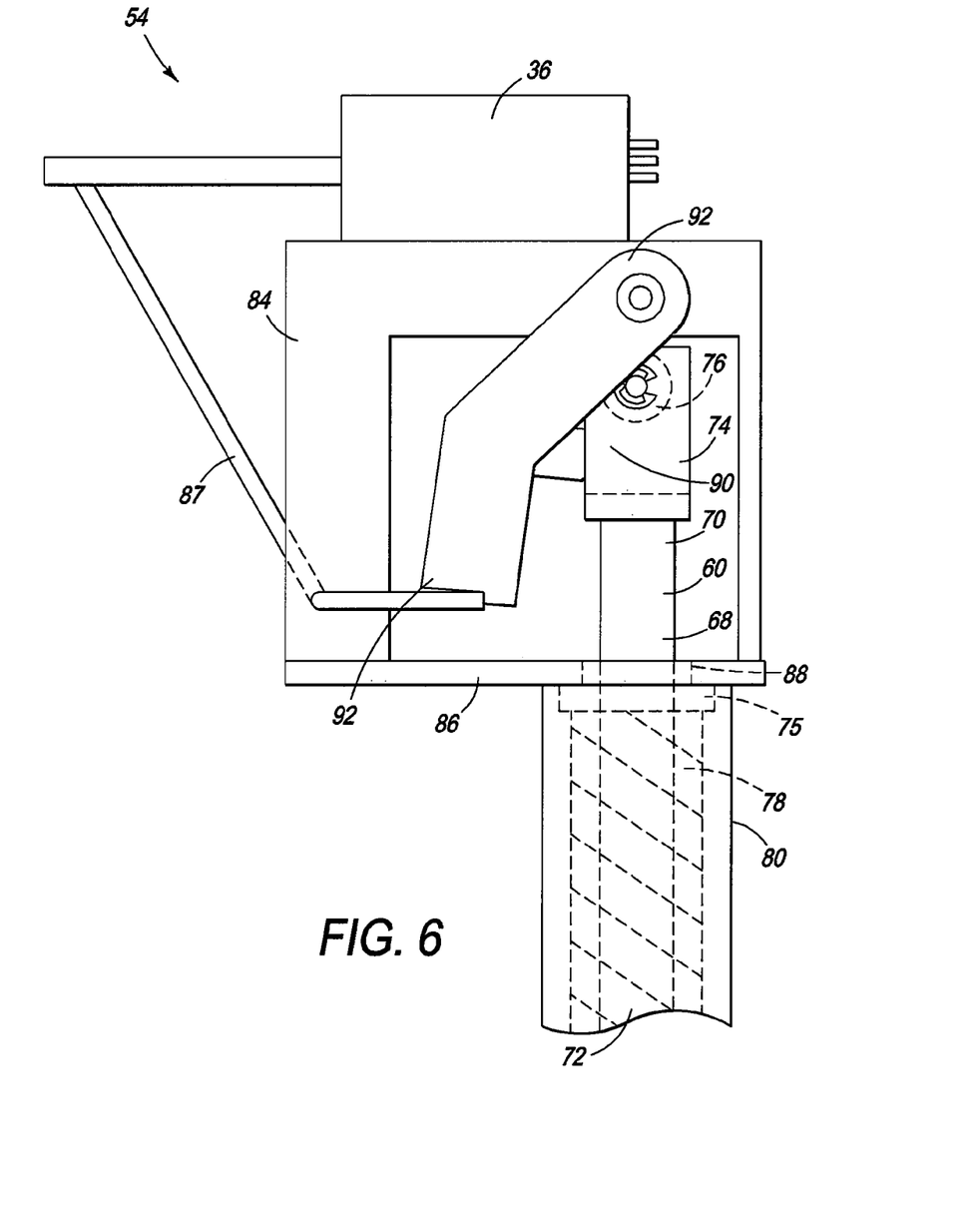
FIG. 6 is a side plan view of the brake actuation mechanism and the first caliper member mounted in the brake actuation mechanism.

The proximal end 70 of the first caliper member 60 is mounted into the brake actuation mechanism 54. The brake actuation mechanism 54 includes a generally "L"-shaped frame 84 having a retention bracket 86. The retention bracket 86 includes a receiving structure 88 for receiving the retainer member 75 of the first caliper member 60, which is placed underneath the retention bracket 86.

When the retainer member 75 is in the receiving structure 88, the proximal end 70 of the first caliper member 60 is pulled upwards against spring force as the retainer member is slid downwardly along the rod 68, until the engaging structure 76 of the first caliper member 60 is received in a releasable structure 90 of the brake actuation mechanism 54. The releasable structure 90 holds the proximal end 70 extended from the retainer member 75 against spring force.

The releasable structure 90 is on at least one, and preferably a plurality of linkages 92 that are attached to the frame 84 of the brake actuation mechanism 54. The releasable structure 90 is generally low in friction and allows the first caliper member 60 to be slidingly released. A lever member 87 is actuated by the solenoid 36 to move the linkages 92. In this configuration, the detection system of FIG. 2 actuates the brake actuation mechanism 54 to let out the compression spring by a signal to the solenoid 36 to pull in. When the linkages 92 are moved by the solenoid 36 pulling in on the lever member 87, the releasable structure 90 pivots out from under the engaging structure 76 to release the compression on the compression spring 78. When the releasable structure 90 is pivoted, the first caliper member 60 is free to displace downward, and is pulled by the compression spring pulling against the retention bracket 86.

The distal end 72 of the first caliper member 60 is slidably received into the tube 58. When the engaging structure 76 is released from the releasable structure 90, the rod 68 slidingly extends from the tube 58 and engages the saw blade 16. When the engaging structure 76 is released from the releasable structure 90, the potential energy stored on the compression spring 78 is exerted on one side of the saw blade 16. Substantially simultaneously, the "C"-shaped brake mechanism 52 displaces with respect to the stationary tube 66 in the direction indicated in FIG. 5. When the first and second portions 56, 62 displace, the second caliper member 64 engages the blade 16 at the opposite side of the blade from the first caliper member 60.

Figure 5:
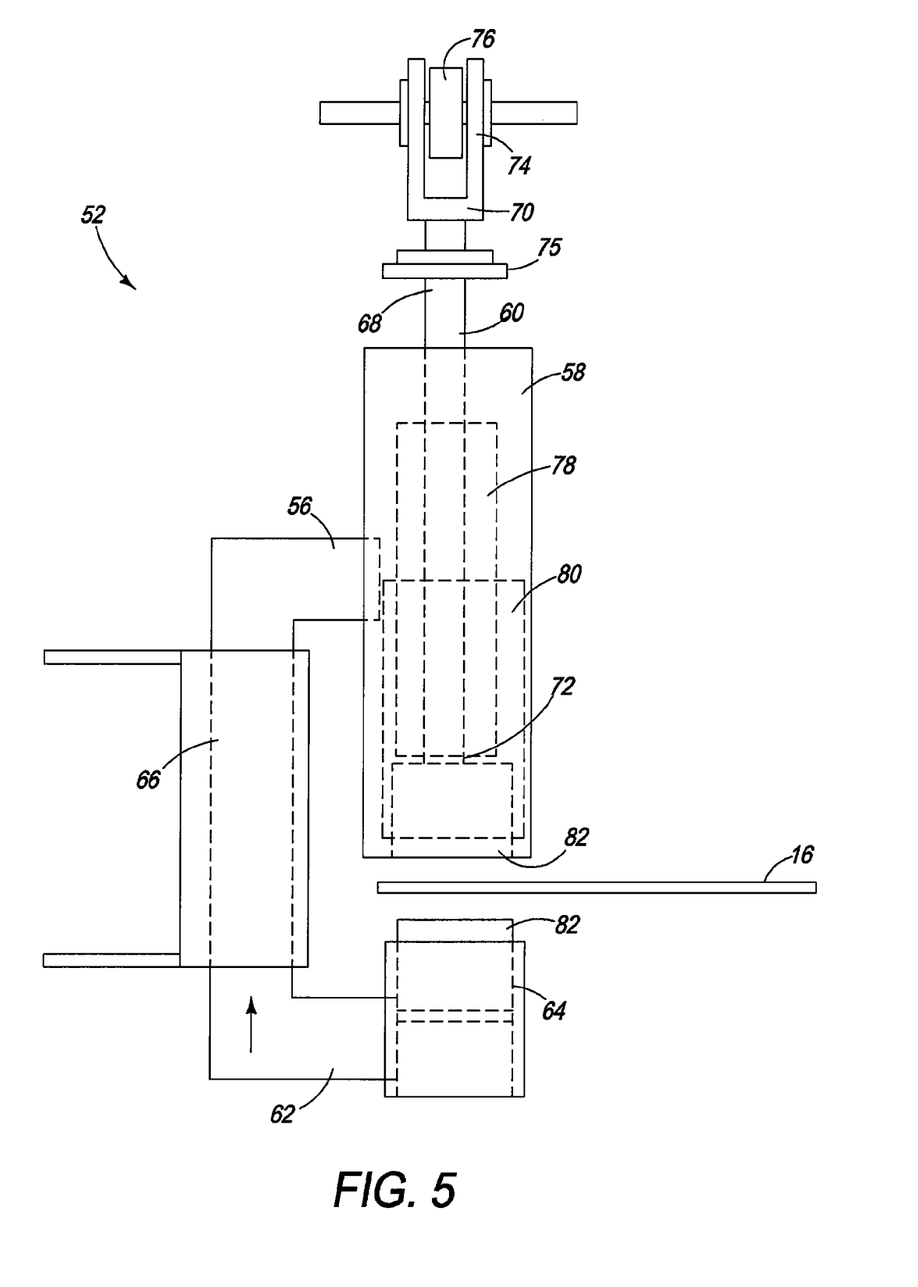
FIG. 5 is a side view of the caliper brake mechanism including first and second caliper members.

The caliper brake mechanism 52 grips the saw blade 16 between the first caliper member 60 and the second caliper member 64. The rubber stoppers 82, preferably made of black neoprene with a flat head, are preferably disposed at the distal ends of both the first and the second caliper members 60, 64 to provide additional frictional resistance. Since both the first and the second caliper members 60, 64 grip the blade 16 at opposing surfaces, the blade is not bent by the brake mechanism 52 during a braking event.

In one particular embodiment, about 0.25 inches of the total spring compression is used through the extension of the first caliper member 60 of about 0.125 inches of air space on each side of the blade 16, leaving about 0.25 inches of the spring compression to stop the blade by applying pressure onto the blade. When the brake mechanism 50 is deployed according to this embodiment, the blade 16 should completely stop within less than 0.1 seconds, and preferably within 0.05 seconds, of the operator contacting the blade. It should be understood that the numeric values of this specific embodiment are given only as an example, and the invention should not be limited by these values.

The braking mechanism 50 such that the blade 16 extends between the first and the second caliper members 60, 64. It is contemplated that the braking mechanism can be attached with the bolt that connects the lower shield to the saw 10. Further, in an alternate embodiment to a displacing brake mechanism, the first and second portions 56, 62 of the "C"-shape brake mechanism 52 can pivot inwardly with respect to each other to engage the rubber stoppers 82 on each side of the blade 16.

Figure 7:
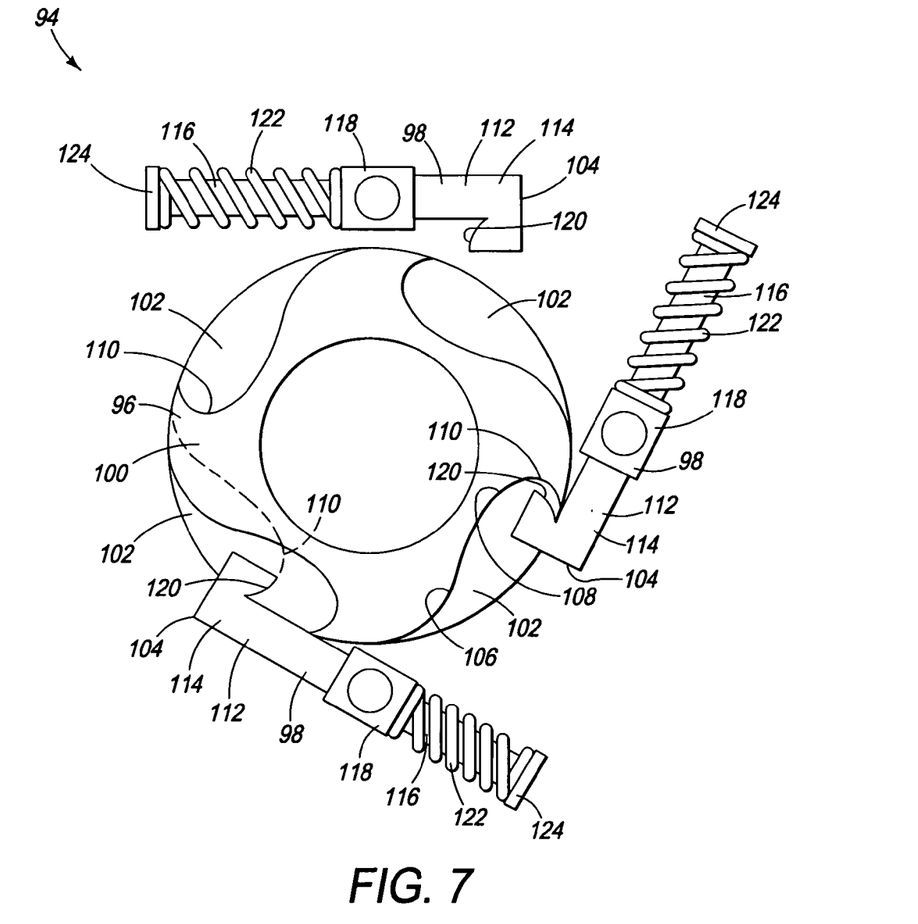
FIG. 7 is a side view of a stopping mechanism including a gear and a latch.

A stopping mechanism, indicated generally at 94, can be used in tandem with, or in place of the braking mechanism 50. Referring now to FIG. 7, the stopping mechanism 94 includes a gear 96 that is static with respect to the blade 16, i.e. rotates with the blade. The stopping mechanism 94 also includes a pivoting latch 98 mounted adjacent the gear 96. A top surface 100 of the gear 96 is generally planar and has detents 102 formed into the surface. The detents 102 are configured to engage with a first end 104 of the pivoting latch 98.

The gear 96 rotates with the blade 16 in the clockwise direction as depicted in FIG. 7. In the preferred embodiment, there are four detents 102 that have a curved shape including a smaller end 106 that gradually increases to a larger end 108. The larger end 108 has a generally concave receiving structure 110.

The pivoting latch 98 includes a moveable member 112 having a first leg 114 and a second leg 116 that is slidingly disposed through a tube 118. On the first leg 114, the moveable member 112 includes a hook structure 120 having a corresponding and generally convex shape to the generally concave receiving structure 110. In this configuration, the receiving structure 110 and the hook structure 120 of the pivoting latch are configured to engage each other such that when the pivoting latch is lowered into range of the gear 96, the pivoting latch will be pulled under and locked into the receiving structure 110 of the detent 102.

On the second leg 116, a coil spring 122 encircles the moveable member The tube 118 is preferably attached to the saw 10 and is pivotable to allow the pivoting latch 98 to pivot towards the gear 96 upon being actuated.

In the first, top position in FIG. 7, the pivoting latch 98 is generally tangential to the gear 96 and is restrained from engaging with the gear with an electromagnet (not shown), however other actuators are contemplated such as a solenoid actuator. Further, it is contemplated that the solenoid 36 of the detection system 30 can actuate the stopping mechanism 94.

In the second, side position of the pivoting latch 98 in FIG. 7, the current running through the electromagnet is reversed, switching the poles, and moving the pivoting latch so that the hook structure 120 is engaged into the detent 102 and locked by the receiving structure 110. As the gear 96 rotates, the pivoting latch 98 is pivoted to orient itself at an angle to engage the gear at.

In the third, bottom position in FIG. 7, the pivoting latch 98 continues to pivot as the hook structure 120 is engaged. To dampen the relatively abrupt stop of the blade 16, the moveable member 112 is pulled through the tube 118 while compressing the coil spring 122 between a second end 124 of the pivoting latch 98 and the tube. When the compression of the coil spring 122 is at a maximum compression, the blade 16 stops. The coil spring 122 will recoil and send the blade 16 spinning in the reverse direction (counterclockwise direction as depicted in FIG. 7) while unlatching and resetting the stopping mechanism 94.

It is contemplated that a pin or other mechanism can be used to prevent the recoil and the spinning of the blade 16 in the opposite direction. It is also contemplated that instead of detents 102 in the top surface 100, that the detents can be cut-away or removed.

Figure 8:
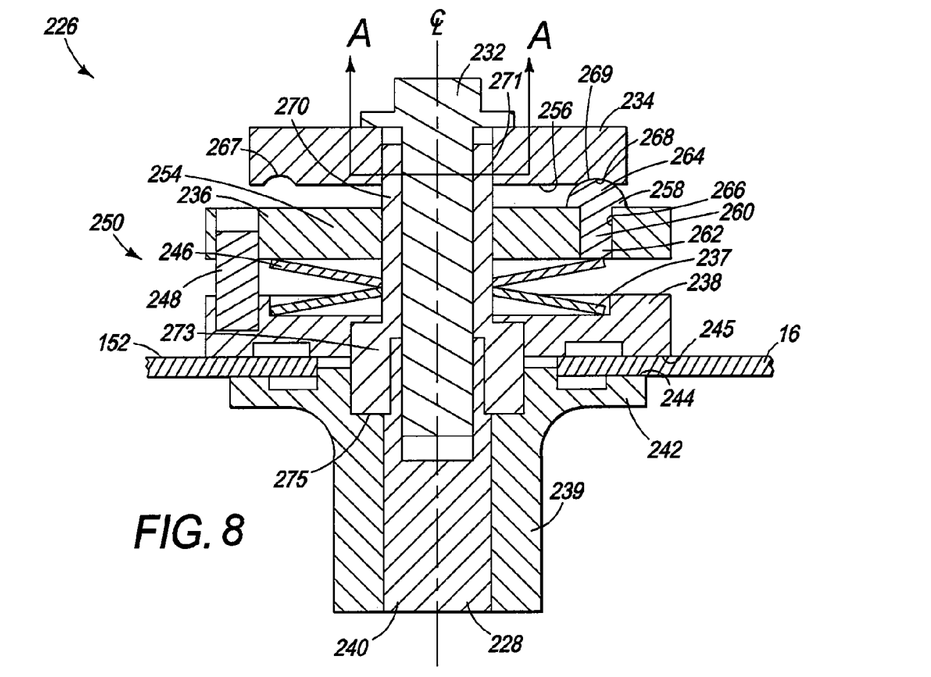
FIG. 8 is a cross section view of a clutch mechanism attached to a drive shaft.
Figure 9:
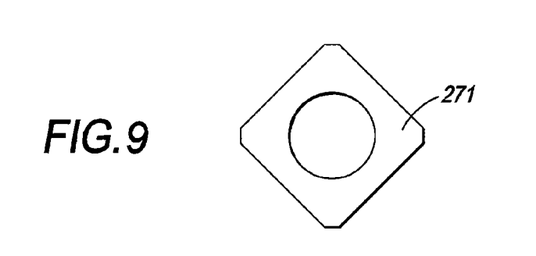
FIG. 9 is a cross section view of a collar of the clutch mechanism of FIG. 8 taken along line A-A in FIG. 8.
Figure 10:
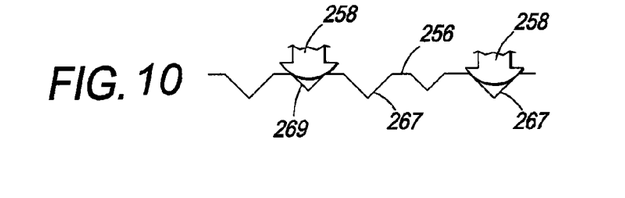
FIG. 10 is a schematic view of a bottom surface of an upper retainer of the clutch mechanism of FIG. 8.

Referring now to FIGS. 8-10, a clutch mechanism for a saw, indicated generally at 226, is configured to allow a blade 16 to slip with respect to a drive shaft 228 when a specified amount of pressure is applied to the blade, such as when a brake mechanism 50 (FIGS. 3 and 4) and/or a stopping mechanism 94 (FIG. 7) is deployed onto the blade. The clutch mechanism 226 is preferably located adjacent the location of attachment of the blade 16 to the drive shaft 228.

The clutch mechanism 226 includes a bolt 232 that is received by an upper retainer 234, an upper plate 236, a lower plate 238, and an inner washer 239 that is disposed around and rotates freely with respect to a top portion 240 of the drive shaft 228. The inner washer 239 is generally cylindrical with a generally annular lip 242. The blade 16 is received between an upper surface 244 of the lip 242, and a lower surface 245 of the lower plate 238, and is secured in place by the bolt 232 and the upper retainer 234.

Between the upper plate 236 and the lower plate 238 are preferably two Belleville disc springs 246, although other numbers and types of springs are contemplated. The Belleville disc springs 246 are preferably concentrically disposed about the bolt 232 and the upper retainer 234, and are preferably disposed in a recess 237 in the lower plate 238. A plurality of alignment pins 248 preferably attach the lower plate 238 to the upper plate 236, forming a layered spring assembly 250 with the Belleville disc springs 246. The alignment pins 248 are preferably fixed with respect to one of the upper and lower plates 236, 238, and slidably received in the other of the plates, such that the plates are not permitted to rotate with respect to each other, but are permitted to have relative movement axially and parallel to the drive shaft 228. In other words, the upper and lower plates 236, 238 are permitted to move closer and further away from each other depending on the amount the Belleville disc springs 246 are compressed. When the Belleville disc springs 246 are compressed, the upper plate 236 and the lower plate 238 move closer together. The upper plate 236, the lower plate 238, the Belleville springs 246 and the alignment pins 248 form the spring assembly 250 for gripping an upper surface 152 of the blade 16.

A collar 270 is concentrically disposed around the bolt 232 and the drive shaft 228. The collar 270 has a top portion 271 that has a generally square fit with the upper retainer 234. The top portion 271 is concentrically disposed around the bolt 232, but preferably does not contact the bolt. The collar 270 has a lower portion 273 that is concentrically disposed around the drive shaft 228, and is disposed in an annular recess 275 of the inner washer 239.

Between an upper surface 254 of the upper plate 236 and a bottom surface 256 of the upper retainer 234 are a plurality of geometric spacers 258, preferably equally spaced around the bolt 232. In the preferred embodiment, three geometric spacers 258 are disposed at 120-degree increments annularly around the upper plate 236, however other numbers of geometric spacers are contemplated. The geometric spacers 258 transfer pressure between the upper retainer 234 and the upper plate 236. It is contemplated that the geometric spacer 258 can be any shape, size or configuration that maintains a space between the upper plate 236 and the upper retainer 234.

In the preferred embodiment, the geometric spacers 258 are screws 260 having a threaded body 262 and a round head 264. The threaded body 262 is preferably received in an aperture 266 on the upper plate 236, and the head 264 protrudes from the aperture 266 to contact the upper retainer 234 with a top surface 268 of the head.

Shallow pockets 269 are disposed on the bottom surface 256 of the upper retainer 234. The shallow pockets 269 are preferably located on the bottom surface 256 of the upper retainer 234. The heads 264 of the geometric spacers engage with the shallow pockets 269, and the upper retainer 234 (through the geometric spacers) compresses the spring assembly 250 to grip the blade 16 between the inner washer 239 and the lower plate 238.

Deep pockets 267 generally corresponding in shape, size and number to the heads 264 of the geometric spacers 258 are preferably located on the bottom surface 256 of the upper retainer 234. In the preferred embodiment, there are three shallow pockets 269 and three deep pockets 267 disposed at 120-degree increments annularly around the upper retainer 234.

When the blade 16 is assembled onto the saw, the blade is placed on the drive shaft 228, and then the spring assembly 250 is placed on top of the blade. When the geometric spacers 258 are disposed in the spring assembly 250, the upper retainer 234 is placed on top of the geometric spacers 258 such that the geometric spacers are in the shallow pockets 269.

The bolt 232 is then inserted and turned, which applies pressure down on the upper retainer 234, which is transmitted through the geometric spacers 258 to the spring assembly 250, which in turn, causes the spring assembly to compress. In this way, the compressive forces on the Belleville disc springs 246 cause the blade 16 to be clamped down between the spring assembly 250 and the inner washer 239.

The amount that the bolt 232 is threadably received into the drive shaft 228 is preferably limited by the collar 270 engaging the inner washer 239. In this configuration, the amount of compression on the Belleville disc springs 246 for a blade of a given width can be consistently deployed. The collar 270 determines the amount that the bolt 232 can be threaded down into the drive shaft 228, which determines the amount of force that is applied to compress the Belleville springs 246, which determines the amount of pressure applied to the blade 16 that is needed to overcome the Belleville springs and permit the blade to move with respect to the drive shaft.

In normal operation, the blade 16, the spring assembly 250 and the upper retainer 234 rotate with the drive shaft 228. However, when a sufficient pressure is applied to the blade 16, such as during application of the braking mechanism 50 or the stopping mechanism 94, the spring assembly 250 and the inner washer 239 continue to grip and move with the blade, while the drive shaft 228, the upper retainer 234, the bolt 232 and the collar 270 continue to rotate with the motor (not shown). During this time, the upper retainer 234 rotates relative to the upper plate 236, and the geometric spacers 258 (which are fixed to the upper plate) move out of engagement with the shallow pockets 269 and traverse the bottom surface 256 of the upper retainer 234 until the geometric spacers are received into the deep pockets 267.

When the geometric spacers 258 are received in the deep pockets 267, the spacing between the upper retainer 234 and the upper plate 236 is decreased. When the spacing is decreased, the amount of force applied to compress the Belleville disc springs 246 is decreased. In turn, the amount of clamping force applied by the spring assembly 250 onto the blade 16 is decreased because the Belleville springs 246 are less compressed. When the clamping force applied by the spring assembly 250 is decreased, the blade 16 "slips" or has relative motion from the drive shaft 228.

As discussed with respect to one specific embodiment of the braking mechanism 50, approximately 0.25 inches of coil spring compression is used to displace the first caliper member 60 to clamp the blade 16 between the first and the second caliper members 64. The remaining approximately 0.25 inches of coil spring compression (after using the first 0.25 inches through air space) causes the braking mechanism 50 to apply pressure to the blade 16. When the caliper members 60, 64 apply torque, the clutch mechanism 226 allows the blade 16 to slip with respect to the drive shaft 128. It should be understood that the numeric values of this specific embodiment are given only as an example, and the invention should not be limited by these values.

When the detection system 30 senses an operator's contact with the blade 16, the detection system initiates a protection system. The protection system is configured to stop the blade 16, and preferably includes the braking mechanism 50, the stopping mechanism 94 and the clutch mechanism 226, although the protection system can include additional mechanisms or can exclude at least one of the braking mechanism and the stopping mechanism.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A clutch mechanism for a power tool having a blade that is driven by a motor that is coupled by a drive shaft, said clutch mechanism comprising:
   a spring assembly generally annularly disposed around the drive shaft, when said spring assembly is compressed, said spring assembly applies a normal force on the blade to force the blade against a generally annular lip;
   an upper retainer generally annularly disposed around the drive shaft and configured to compress said spring assembly, said retainer having at least one shallow pocket and at least one deep pocket in a lower surface of said retainer;
   at least one geometric spacer disposed between said spring assembly and said upper retainer;
   wherein said spring assembly is disposed between said upper retainer and the blade;
   wherein when a braking pressure is applied to the blade, said blade will slip with respect to one of said spring assembly or said generally annular lip, which causes said geometric spacer to displace out of engagement with said shallow pocket and engage into and remain seated in said deep pocket and reduce the normal force applied by said spring assembly onto the blade.

2. The clutch mechanism of claim 1 wherein when pressure or torque is applied to the blade, said upper retainer moves relative to said spring assembly to permit said geometric spacer to traverse out of said at least one shallow pocket, along said lower surface and to engage in said at least one deep pocket.

3. A clutch mechanism for a power tool having a rotating component that is driven by a motor that is coupled by a drive shaft, said clutch mechanism comprising:
   a spring assembly generally annularly disposed around the drive shaft, when said spring assembly is compressed, said spring assembly applies a normal force on the rotating component to force the rotating component against a generally annular lip, said spring assembly including (i) a bolt generally aligned with the drive shaft, (ii) an upper plate annularly disposed around said bolt, (iii) a lower plate annularly disposed around said bolt, (iv) a spring member disposed between said upper plate and said lower plate, and (v) at least one alignment pin disposed a radial distance from said bolt and configured to fix said upper plate to said lower plate and to permit said upper plate to displace axially and generally parallel to the drive shaft with respect to said lower plate;
   an upper retainer generally annularly disposed around the drive shaft and configured to compress said spring assembly, said retainer having at least one shallow pocket and at least one deep pocket in a lower surface of said retainer; and
   at least one geometric spacer disposed between said spring assembly and said upper retainer,
   wherein said spring assembly is disposed between said upper retainer and the rotating component, and
   wherein when a braking pressure is applied to the rotating component, said rotating component will slip with respect to one of said spring assembly or said generally annular lip, which causes said geometric spacer to displace out of engagement with said shallow pocket and engage into and remain seated in said deep pocket and reduce the normal force applied by said spring assembly onto the rotating component.

4. The clutch mechanism of claim 3 wherein when pressure or torque is applied to the rotating component, said upper retainer moves relative to said spring assembly to permit said geometric spacer to traverse out of said at least one shallow pocket, along said lower surface and to engage in said at least one deep pocket.

* * * * *